(12) United States Patent
Avetisian et al.

(10) Patent No.: US 6,644,198 B1
(45) Date of Patent: Nov. 11, 2003

(54) INTEGRAL PYROTECHNIC INITIATOR WITH MOLDED CONNECTOR

(75) Inventors: Vahan Avetisian, Newbury Park, CA (US); Mher Chimayan, Burbank, CA (US)

(73) Assignee: Special Devices, Inc., Moorpark, CA (US)

( * ) Notice: Subject to any disclaimer, the term of this patent is extended or adjusted under 35 U.S.C. 154(b) by 8 days.

(21) Appl. No.: 09/703,097

(22) Filed: Oct. 31, 2000

(51) Int. Cl.[7] .............................................. F42C 19/12
(52) U.S. Cl. ............................ 102/202.14; 102/202.9; 280/741
(58) Field of Search .................... 102/202.5, 202.7, 102/202.8, 202.9, 202.12, 202.14; 280/741

(56) References Cited

U.S. PATENT DOCUMENTS

| | | | |
|---|---|---|---|
| 5,423,261 A | * 6/1995 | Bernardy et al. | 102/202.5 |
| 5,445,406 A | * 8/1995 | Jones | 280/741 |
| 5,487,559 A | * 1/1996 | Headley | 280/741 |
| 5,531,473 A | * 7/1996 | Rink et al. | 280/737 |
| 5,558,366 A | * 9/1996 | Fogle, Jr. et al. | 280/736 |
| 5,596,163 A | * 1/1997 | Caflisch et al. | 102/202.7 |
| 5,686,691 A | * 11/1997 | Hamilton et al. | 102/202.5 |
| 5,772,243 A | * 6/1998 | Green et al. | 280/741 |
| 6,073,963 A | * 6/2000 | Hamilton et al. | 280/741 |
| 6,146,598 A | * 11/2000 | Duvacquier et al. | 280/741 |
| 6,161,481 A | * 12/2000 | Shirk et al. | 102/530 |

* cited by examiner

*Primary Examiner*—Stephen M. Johnson
(74) *Attorney, Agent, or Firm*—Law Offices of Thomas J. Brindisi

(57) ABSTRACT

A pyrotechnic initiator has a molded connector with a hollow interior, where the connector includes at least one locking tab extending from the connector wall toward the centerline of the connector, overhanging the hollow interior of the connector. A mating connector can be inserted past the locking tab for a mounting connection and pulled out past the locking tab for disconnecting the pyrotechnic initiator. The molded connector feature preferably is injection molded around a molding assembly which is used to form at least one locking tab. Cavities corresponding to the location of the locking tabs are provided by the intersection of separate pieces of the molding assembly.

20 Claims, 2 Drawing Sheets

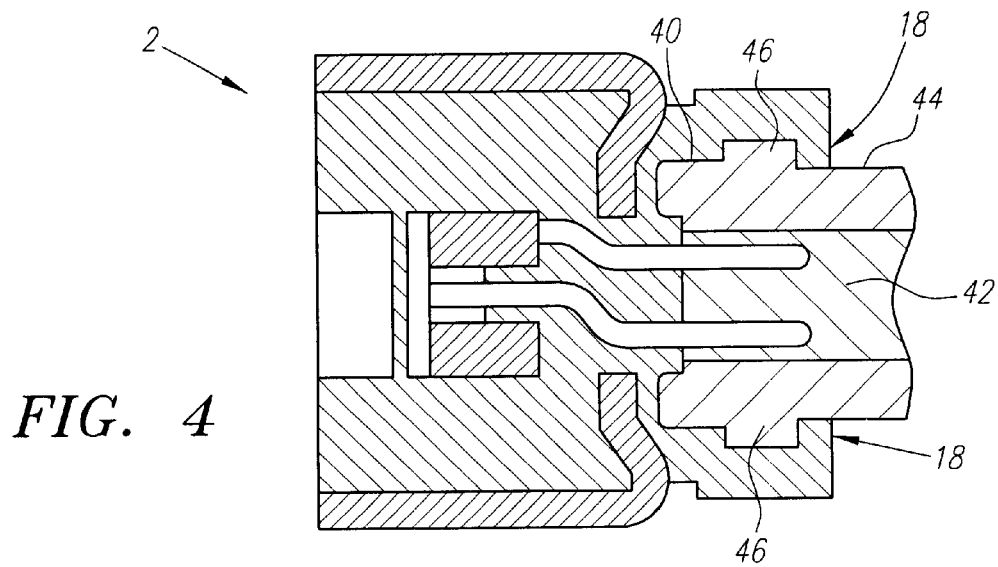
FIG. 4
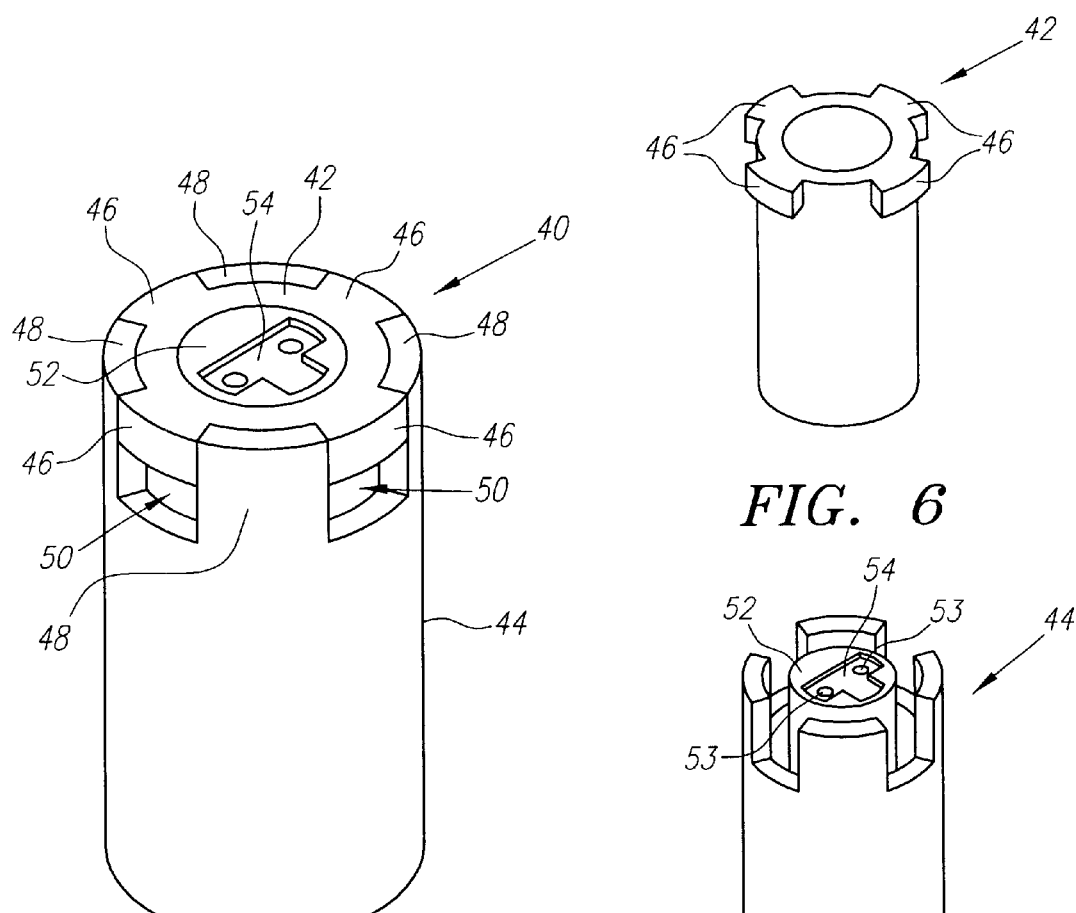
FIG. 5
FIG. 6
FIG. 7

INTEGRAL PYROTECHNIC INITIATOR WITH MOLDED CONNECTOR

BACKGROUND OF THE INVENTION

The field of this invention generally relates to pyrotechnic initiators, and more particularly to an integral pyrotechnic initiator with a molded connector.

Pyrotechnic initiators have many uses in industrial and consumer applications. One important use is the inflation of airbags in motor vehicles. A pyrotechnic initiator is placed in an airbag module. When ignited, the pyrotechnic initiator releases gas and heat that activates a gas generator, ruptures a sealed gas unit, or performs some other work which inflates the airbag. The pyrotechnic initiator is typically tightly secured into its surroundings in the motor vehicle by one of a number of commonly-used attachment strategies. The pyrotechnic initiator is also electrically attached to control circuitry in the motor vehicle via a connector mounted on the vehicle. A vehicle connector commonly used in the industry includes a number of tabs corresponding in size and location to through holes on a portion of the initiator that mates with that connector. These tabs on the vehicle connector snap into the through holes on the initiator when the connector is pressed into mating connection with the initiator, thereby holding the connector in place. In some designs, the wall of the initiator structure in the vicinity of the through holes are composed of plastic, nylon, or other nonconductive material. Although the through holes are useful for mating the vehicle connector to the initiator, they weaken the structure of the initiator, particularly in a plane passing substantially perpendicular to the connector centerline that intersects a through hole. This weakening reduces the force required to pull the connector off of the initiator, referred to as pullout resistance.

SUMMARY OF THE PREFERRED EMBODIMENTS

The present invention is directed toward a pyrotechnic initiator having a molded connector feature.

In one aspect of a preferred embodiment, the molded connector feature has a hollow interior and includes at least one radially-projecting locking tab extending inward from the wall of the molded connector feature.

In another aspect of a preferred embodiment, the molded connector feature is injection molded around a molding assembly which is used to form at least one locking tab. The molding assembly preferably includes two separate pieces, one of which is preferably adapted to protect the electrical leads of the initiator during the molding process. Cavities corresponding to the location of the locking tabs are provided by the intersection of the two pieces of the molding assembly.

BRIEF DESCRIPTION OF THE DRAWINGS

FIG. 4 is a sectional view similar to FIGS. 2 and 3 of the pyrotechnic initiator as the core is forming the interior of the connector feature of the pyrotechnic initiator.

FIG. 5 is a perspective view of a molding assembly having a core and a sleeve.

FIG. 6 is a perspective view of the core of FIG. 5.

FIG. 7 is a perspective view of the sleeve of FIG. 5.

DETAILED DESCRIPTION OF THE PREFERRED EMBODIMENTS

Figure 2:
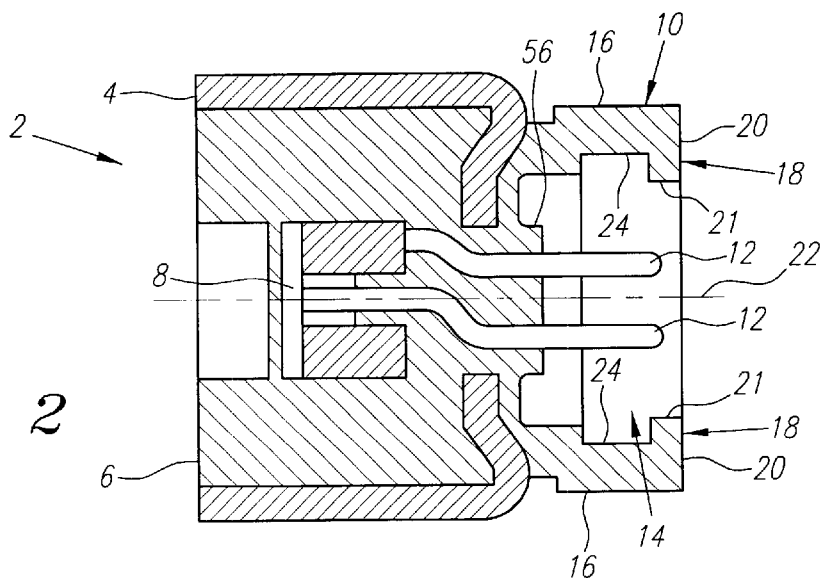
FIG. 2 is a sectional view taken on the line 2—2 of FIG. 1.
Figure 1:
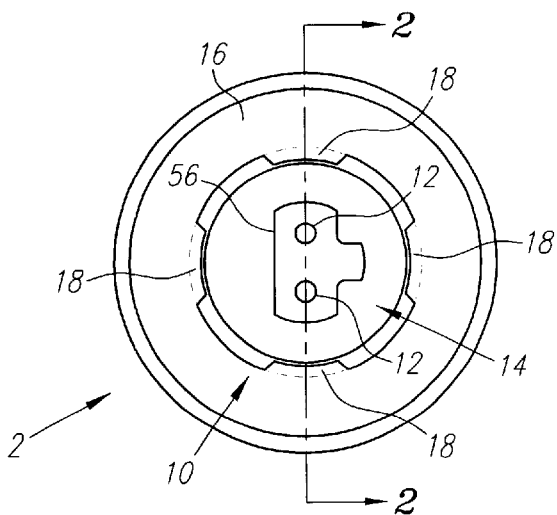
FIG. 1 is an end view of a pyrotechnic initiator of the present invention.

Referring to FIGS. 1 and 2, a pyrotechnic initiator 2 is seen. The pyrotechnic initiator 2 includes a retainer 4 that is preferably metallic. A body 6 is formed in the retainer 4, preferably by an injection molding process as described below. The retainer 4 protects at least a portion of the body 6, provides structural strength to the pyrotechnic initiator 2, and assists in connecting the pyrotechnic initiator 2 to the structure where it is used. As seen in FIG. 2, in a preferred embodiment, the retainer 4 takes the shape of a body of rotation of a substantially L-shaped form. However, the retainer 4 is not limited to such a shape, and may be shaped differently as needed to construct the pyrotechnic initiator 2 to be compatible with external connectors or structure.

The body 6 is composed of a nonconductive material, preferably nylon. However, other nonconductive materials, such as plastic, capable of being molded or formed into a desired shape while having adequate strength, durability and suitability for pyrotechnic applications may be used. In a preferred embodiment, an igniter 8 is formed into the body 6. The igniter 8 comprises a pyrotechnic charge which combusts when exposed to an electric charge or other stimulus. The selection and use of a pyrotechnic charge in the igniter 8 is known to those skilled in the art. In another preferred embodiment, an explosive can (not shown) is attached to the body 6 and forms a part of the initiator 2. The igniter 8 may be located adjacent to or inside the can, as long as the combustion of the igniter 8 is capable of igniting the larger pyrotechnic charge inside the can. The construction and use of an explosive can is well known to those skilled in the art.

Figure 3:
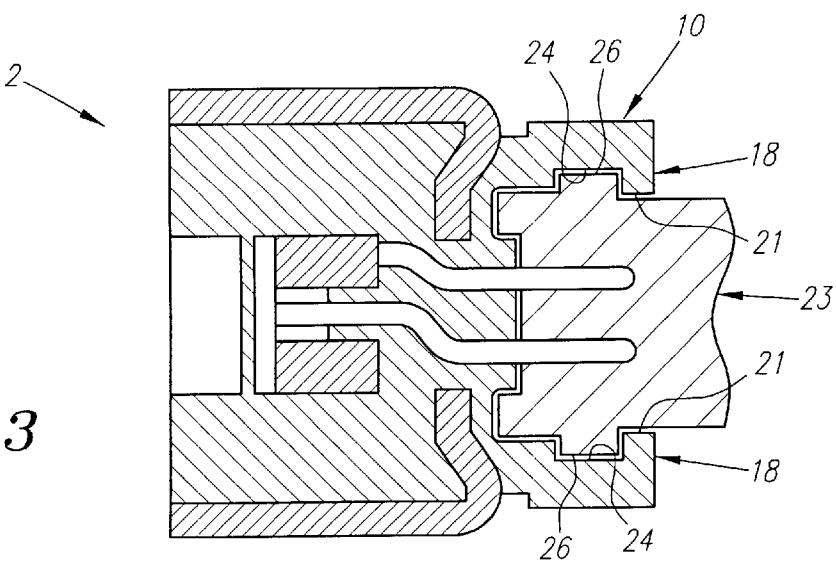
FIG. 3 is a sectional view similar to FIG. 2 of the pyrotechnic initiator engaging a mating connector.

The body 6 also includes an integrally-molded connector 10, preferably located at the opposite end of the pyrotechnic initiator 2 from the retainer 4. Referring as well to FIG. 3, the connector 10 is adapted to connect with a mating vehicle connector 23 provided at the place of use of the pyrotechnic initiator 2, such as a steering wheel or motor vehicle dashboard. In a preferred embodiment, the outer surface of the connector 10 is substantially cylindrical. Preferably, two electrical leads 12 extend from the igniter 8 through the body 6 into a hollow interior 14 within the connector 10. The combination of the electrical leads 12 and the igniter 8 may be referred to as the pyrotechnic ignition assembly. Because the retainer 4 is preferably metallic, and is therefore conductive, the pyrotechnic initiator 2 is constructed such that the electrical leads 12 do not come in contact with the retainer 4. Because the body 6 is nonconductive, the body 6 prevents stray current from entering the electrical leads 12 through an unexpected path, thereby preventing accidental ignition of the igniter 8. Alternately, if the retainer 4 is not conductive, the electrical leads 12 may contact the retainer 4 without ill effect.

The hollow interior 14 of the connector 10 is laterally bounded by a connector wall 16. In a preferred embodiment, the connector wall 16 is substantially cylindrical and continuous. However, other shapes may be formed, if desired. A rim 20 is located at the end of the connector wall 16 opposite from the retainer 4. At least one locking tab 18 is attached to the connector wall 16. Preferably, each locking tab 18 extends inward from the rim 20 of the connector wall 16. However, the locking tabs 18 need not be positioned on the rim 20; the connector wall 16 may extend in an axial direction beyond the locking tabs 18 if desired. Preferably, if more than one locking tab 18 is used, an even number of locking tabs 18 are placed symmetrically along the rim 20 of the connector wall 16. An odd number of locking tabs 18 instead may be placed along the rim 20. The locking tabs 18 may be placed asymmetrically along the rim if desired, which may be useful for registering the mating vehicle connector onto the initiator 2 in a particular orientation. The inner surface of each locking tab 18 facing the centerline 22 of the connector 10 preferably is curved along a semicircular arc defined along a radius extending perpendicular to the centerline 22. If more than one locking tab 18 is used, each preferably has substantially the same length. However, each locking tab 18 may have a different length, if desired. Alternately, providing one or more locking tabs 18 having different lengths may be useful for registering the mating vehicle connector 23 onto the initiator 2 in a particular orientation.

Advantageously, four locking tabs 18 are used, as shown in FIG. 1. Where four locking tabs 18 are used, each locking tab 18 is substantially as long as a forty-five degree arc segment of the connector wall 16, and each locking tab 18 is spaced substantially forty-five degrees apart from the adjacent locking tabs 18 along the connector wall 16.

The desired thickness of each locking tab 18 is dependent on the size of the locking tab 18 and connector 10, the flexibility of the material with which the locking tab 18 is constructed, and the forces expected to be exerted on the initiator 2 in a particular application. Where the connector 10 is molded from nylon, and the initiator 2 is used in a standard airbag application, each locking tab 18 is preferably substantially 1.5 mm thick. However, a thickness other than 1.5 mm may be used, as long as each locking tab 18 has adequate flexibility to allow the vehicle connector 23 to mate with the connector 10, and adequate rigidity to hold the vehicle connector 23 onto the connector 10 against forces expected to be exerted on the initiator 2 during the lifetime of the connection. Where multiple locking tabs 18 are used, each locking tab 18 preferably has substantially the same thickness.

In a preferred embodiment, the locking tab 18 overhangs the interior 14 of the connector 10. Overhang is the distance, measured perpendicular to the centerline 22 of the connector 10, between the inner surface 21 of the locking tab 18 and the adjacent inner surface of the hollow interior 14 of the connector 10. The overhang distance is preferably substantially the same along the entire length of each locking tab 18, but may vary along the length of each locking tab 18 if desired. If more than one locking tab 18 is used, the overhang distance preferably is substantially the same for each locking tab 18. The desired amount of overhang of each locking tab 18 is dependent on the size of the locking tab 18 and the connector 10, the flexibility of the material used to mold the connector 10, and the forces expected to be exerted on the initiator 2 in a particular application. Where the connector 10 is molded from nylon, and the initiator 2 is used in a standard airbag application, each locking tab 18 preferably extends inward substantially 1.5 mm from the inner surface of the adjacent connector wall 16. This thickness provides a balance between adequate flexibility to allow the initiator connector 10 to mate with the vehicle connector 23, and adequate rigidity to hold the vehicle connector 23 onto the connector 10 against forces expected to be exerted on the initiator 2 during the lifetime of the connection.

When the vehicle connector 23 is mated with the connector 10, the locking tabs 18 hold the vehicle connector 23 in place on the connector 10. The vehicle connector 23 includes an engagement structure 26 which has a diameter larger than the distance between the inner surfaces 21 of the locking tabs 18. The engagement structure 26 is preferably substantially annular, and preferably extends continuously around the outer surface of the vehicle connector 23. By having a diameter larger than the distance between the inner surfaces 21 of the locking tabs 18, the engagement structure 26 holds the vehicle connector 23 in mating engagement with the connector 10. Alternately, other configurations of the engagement structure 26 may be used, as long as the engagement structure 26 provides secure engagement against the locking tabs 18 to resist pullout of the vehicle connector 23. The vehicle connector 23 is installed in the initiator connector 10 by aligning socket holes in the vehicle connector 23 with the electrical leads 12 on the connector 10 and axially pushing the vehicle connector engagement structure 26 past the locking tabs 18, which bend and are flexed radially outwardly. Similarly, the vehicle connector 23 and connector 10 are disconnected by merely pulling them apart, which causes the locking tabs 18 to bend and flex radially outward as the engagement structure 26 engages them. The difference between the diameter of the engagement structure 26 and the width of the opening in the connector 10, combined with the rigidity of the locking tabs 18, holds the vehicle connector 23 onto the connector 10.

The physical configuration of the locking tabs 18 allows for connection and disconnection between the initiator connector 10 and the vehicle connector 23 as required, and provides for secure retention of the vehicle connector 23 after mating with the initiator connector. The connector wall 16 is substantially free from gaps, holes and other structural discontinuities, thereby enhancing its reliability and strength, and may therefore be referred to as a solid wall. Thus, the pullout resistance of the initiator connector 10, which is the force required to separate the vehicle connector 23 from the initiator connector 10, is greater than the pullout resistance of initiators known in the art.

The body 6 is molded in place around the retainer 4, preferably by injection molding. The injection molding process is well known to those skilled in the art. A hot liquid is injected into a mold having the desired shape of the finished product, then allowed to cool. Referring to FIG. 5, a molding assembly 40 is shown. The molding assembly 40 is used to form the hollow interior 14 of the connector 10 during the injection molding process. Referring as well to FIGS. 6–7, in a preferred embodiment, the molding assembly 40 includes a core 42 and a sleeve 44. Preferably, one or more protrusions 46 extend radially from the edge of the core 40. The sleeve 44 includes a number of extensions 48 corresponding to the number of protrusions 46, spaced apart to receive the protrusions 46 between them. The distance that the extensions 48 extend in the axial direction is larger than the distance that the protrusions 46 extend in the axial direction, creating a cavity 50 adjacent each protrusion 46. The protrusions 46 and the extensions 48 are sized and shaped such that the size and shape of the resultant cavities 50 correspond to the desired size, shape and position of the locking tabs 18.

The core 42 preferably has a substantially hollow cylindrical body. The outer diameter of the core 42 is sized such that it corresponds to the diameter of the opening in the connector 10 through which the vehicle connector 23 mates with the initiator connector 10. The sleeve 44 preferably includes a center piece 52 adapted to receive the hollow interior of the core 42. Preferably, the center piece 52 is circular and has an outer diameter slightly less than the inner diameter of the hollow interior of the core 42. Referring as well to FIG. 4, the center piece 52 preferably includes a number of holes 53 corresponding to the number of electrical leads 12 extending into the connector 10. The electrical leads 12 slide into the holes 53, and are thereby protected from damage during the injection molding process and protected from exposure to injection molding liquid and its subsequent solidification. The center piece 52 may include a depression 54 corresponding to the shape of an alignment feature 56 as shown in FIGS. 1–2. The alignment feature 56 ensures that the vehicle connector 43 as shown in FIG. 3 can only be mated to the connector 10 in a single orientation.

Referring to FIGS. 4–7, the molding assembly 40 is used to form the body 6 and the connector 10 as part of the injection molding process. The molding assembly 40 is placed into a mold (not shown) having a cavity which is a negative of the desired shape of the finished body 6 and connector 10. The retainer 4, igniter 8 and electrical leads 12 are also placed in the mold. The molding assembly 40 is placed in the mold such that the cavities 50 correspond to the location of the locking tabs 18 on the finished connector 10. The sleeve 44 protects the electrical leads 12 during the electrical molding process, by engaging the electrical leads 12 in the holes 53 within the center piece 52. The molding assembly 40 is preferably positioned to extend out of the mold.

Hot liquid is then injected into the mold. In a preferred embodiment, the liquid is nylon. However, other nonconductive fluid suitable for injection molding and suitable for use in pyrotechnic applications may be used, if desired. The hot liquid is then allowed to cool and harden. The sleeve 44 is then removed from the connector 10 by pulling it out substantially along its axial direction. The core 42 is then rotated substantially forty-five degrees along its axis, then removed from the connector 10 by pulling it out substantially along its axial direction. By rotating the core 42 in that manner, the protrusions 46 can move between the locking tabs 18 as the core 42 moves along its axial direction, allowing the core 42 to be removed from the connector 10. What remains after removal of the molding assembly 40 from the mold is an initiator 2 having a connector 10 as described above. Variations in this molding process that still produce the desired shape of the connector 10 are within the scope of this invention.

A preferred pyrotechnic initiator having a molded connector, a process for making such an initiator, and many of their attendant advantages, has thus been disclosed. It will be apparent, however, that various changes may be made in the form, construction and arrangement of the parts or in the steps of the process without departing from the spirit and scope of the invention, the form and process hereinbefore described being merely a preferred or exemplary embodiment thereof. Therefore, the invention is not to be restricted or limited except in accordance with the following claims and their legal equivalents.

What is claimed is:

1. A pyrotechnic initiator for mating, comprising:
   a pyrotechnic igniter including a top, a bottom including one or more electrical leads, and an outer surface between said top and said bottom;
   a retainer; and
   a molded nonconductive body intimately and directly bonded to substantially all of said outer surface of said igniter and to said retainer, said body including a connector comprising:
      a substantially solid connector wall defining a hollow interior and including a substantially cylindrical exposed inner surface; and
      at least one exposed locking tab extending inwardly from said inner surface and radially extending along less than substantially all of the radial extent of said substantially cylindrical exposed inner surface of said connector wall.

2. The pyrotechnic initiator of claim 1, wherein said connector has a plurality of said locking tabs.

3. The pyrotechnic initiator of claim 2, wherein said connector wall has a rim around which said plurality of locking tabs are positioned.

4. The pyrotechnic initiator of claim 3, wherein said locking tabs are positioned substantially symmetrically along said rim.

5. The pyrotechnic initiator of claim 3, wherein said locking tabs are positioned substantially evenly along said rim.

6. The pyrotechnic initiator of claim 2, wherein said connector has four locking tabs.

7. The pyrotechnic initiator of claim 1, wherein said at least one locking tab extends substantially along a length defined by a forty-five degree arc segment of said inner surface.

8. The pyrotechnic initiator of claim 1, wherein said nonconductive body is substantially composed of nylon.

9. The pyrotechnic initiator of claim 8, wherein said connector includes a rim with a plurality of inwardly-extending locking tabs positioned symmetrically and spaced evenly along said rim, and said one or more electrical leads extend into said hollow interior of said connector.

10. The pyrotechnic initiator of claim 9, wherein said connector is a universal connector.

11. A pyrotechnic initiator for mating made by a method comprising the steps of:
    providing a pyrotechnic igniter including a top, a bottom including one or more electrical leads, and an outer surface between said top and said bottom;
    providing a retainer; and
    intimately and directly bonding a molded nonconductive body to substantially all of said outer surface of said igniter and to said retainer, said body including a connector comprising:
       a substantially solid connector wall defining a hollow interior and including a substantially cylindrical exposed inner surface; and
       at least one exposed locking tab extending inwardly from said inner surface and radially extending along less than substantially all of the radial extent of said substantially cylindrical exposed inner surface of said connector wall.

12. The initiator of claim 11, wherein said step of intimately and directly bonding includes the following steps:
    placing said retainer in a mold along with said igniter and one or more electrical leads;
    forming at least one cavity at the intersection of separate parts of a molding assembly;
    engaging said one or more electrical leads with said molding assembly; and,
    injecting hot liquid into said mold, said liquid adapted for injection molding, whereby at least one locking tab is formed at the location of said at least one cavity.

13. The initiator of claim 12, wherein said molding assembly includes a sleeve, and a core, said core having a plurality of protrusions.

14. The initiator of claim 13, wherein said method further comprises the steps of:
    moving said sleeve in a substantially axial direction;

rotating said core; and, moving said core in a substantially axial direction.

15. A method of making a pyrotechnic initiator for mating, comprising the steps of:

provided a pyrotechnic igniter including a top, a bottom including one or more electrical leads, and an outer surface between said top and said bottom;

providing a retainer; and intimately and directly bonding a molded nonconductive body to substantially all of said outer surface of said igniter and to said retainer, said body including a connector comprising:

a substantially solid connector wall defining a hollow interior and including a substantially cylindrical exposed inner surface; and at least one exposed locking tab extending inwardly from said inner surface and radially extending along less than substantially all of the radial extent of said substantially cylindrical exposed inner surface of said connector wall.

16. The method of claim 15, wherein said nonconductive body is substantially composed of nylon.

17. The method of claim 15, wherein said connector is a universal connector.

18. The method of claim 15, wherein said step of intimately and directly bonding includes the following steps:

placing said retainer in a mold along with said igniter and one or more electrical leads;

forming at least one cavity at the intersection of separate parts of a molding assembly;

engaging said one or more electrical leads with said molding assembly; and, injecting hot liquid into said mold, said liquid adapted for injection molding, whereby at least one locking tab is formed at the location of said at least one cavity.

19. The method of claim 18, wherein said molding assembly includes a sleeve, and a core, said core having a plurality of protrusions.

20. The method of claim 19, further comprising the steps of:

moving said sleeve in a substantially axial direction;

rotating said core; and, moving said core in a substantially axial direction.

* * * * *